United States Patent
Lai et al.

(10) Patent No.: US 7,995,447 B2
(45) Date of Patent: *Aug. 9, 2011

(54) METHOD FOR CONTROLLING READ POWER AND OPEN-LOOP READ CONTROL DEVICE USING THE SAME

(75) Inventors: Yi-Lin Lai, Taipei (TW); Chin-Yin Tsai, Junghe (TW)

(73) Assignee: Tian Holdings, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/755,037

(22) Filed: Apr. 6, 2010

(65) Prior Publication Data
US 2010/0188944 A1      Jul. 29, 2010

Related U.S. Application Data

(63) Continuation of application No. 10/892,770, filed on Jul. 16, 2004, now Pat. No. 7,693,022.

(60) Provisional application No. 60/488,701, filed on Jul. 18, 2003.

(51) Int. Cl.
*G11B 7/00* (2006.01)

(52) U.S. Cl. ................................ 369/116; 369/53.26

(58) Field of Classification Search ................ None
See application file for complete search history.

(56) References Cited

U.S. PATENT DOCUMENTS

| 3,895,292 A | 7/1975 | Zair et al. |
| 6,016,297 A | 1/2000 | Nagasawa et al. |
| 6,621,778 B1 | 9/2003 | Lu et al. |
| 7,693,022 B2 | 4/2010 | Lai et al. |
| 2002/0181365 A1 | 12/2002 | Nakajo |
| 2002/0196719 A1 | 12/2002 | Morishima |

FOREIGN PATENT DOCUMENTS

| CN | 1402231 A | 3/2003 |
| CN | 1416121 A | 5/2003 |

*Primary Examiner* — Joseph Haley
(74) *Attorney, Agent, or Firm* — Perkins Coie LLP

(57) ABSTRACT

A method for controlling read power and an open-loop read control device using the same. The open-loop read control device is used in an optical disk writer and includes a memory, a DAC and an amplifier. The optical disk writer includes a pickup head device having a laser diode. When writing is disabled, the read power of the optical disk writer for reading the disk corresponds to a specific voltage. The memory stores a relationship curve and outputs a corresponding reference value corresponding to the specific voltage. The DAC converts the corresponding reference value into an analog corresponding reference value. The amplifier receives the analog corresponding reference value and outputs a read power control voltage, which controls the laser diode to generate a substantially constant read power in the write process.

13 Claims, 5 Drawing Sheets

METHOD FOR CONTROLLING READ POWER AND OPEN-LOOP READ CONTROL DEVICE USING THE SAME

This application is a continuation application of commonly assigned U.S. patent application Ser. No. 10/892,770, filed on Jul. 16, 2004 now U.S. Pat. No. 7,693,022, and entitled "METHOD FOR CONTROLLING READ POWER AND OPEN-LOOP READ CONTROL DEVICE USING THE SAME", which claims the benefit of U.S. provisional application Ser. No. 60/488,701, filed Jul. 18, 2003, the subject matter of which is incorporated herein by reference.

BACKGROUND OF THE INVENTION

1. Field of the Invention

The invention relates in general to a method for controlling read power and an open-loop read control device using the same, and more particularly to an open-loop read control device that generates a read power control voltage to control read power of a writing laser diode.

2. Description of the Related Art

FIG. 1 is a block diagram showing a conventional CD writer. Referring to FIG. 1, the optical disk writer mainly has a read control device 10, a write control device 20 and a pickup head device 30. When the data read/write operation is to be performed, the pickup head device 30 generates a current iD flowing through a laser diode 301 so as to generate a laser beam to read/write a CD-R disk 40. The pickup head device 30 has a monitor diode 302 for generating a current iM according to the laser beam generated by the laser diode 301. An OP amplifier 303 processes the current iM and generates a feedback control signal FPDO. The feedback control signal FPDO is fed back to the input terminals of the read control device 10 and the write control device 20 in order to control read/write power of the laser diode 301 when the read/write operation is being performed.

FIG. 2 is a detailed circuit block diagram showing a read control device 10 and a write control device 20. As shown in FIG. 2, after the feedback control signal FPDO is inputted to the read control device 10, a sample/hold unit (S/H) 101 samples and holds the signal FPDO to obtain a signal FPDO_SH and input the signal FPDO_SH to a negative input terminal of an amplifier 102. A reference voltage Vref is inputted to a positive input terminal of the amplifier 102. An output signal dV1 of the amplifier 102 equals a difference between the signal FPDO_SH and the reference voltage Vref. The output signal dV1 is amplified by G11 times and then inputted to a negative input terminal of an amplifier (OP1) 103 through a resistor Ri1. A voltage DAC1 is inputted to a positive input terminal of the amplifier (OP1) 103. Consequently, a signal VRDCO outputted from the amplifier OP1 equals DAC1+(Rf1/Ri1)*(DAC1−(Vref−FPDO_SH)*G11).

FIG. 3 shows signal waveforms of the feedback control signal FPDO and a read sampling signal Rfpdo_SH when a low-speed write operation is being performed. In time slot T1, a potential difference between the feedback control signal FPDO and the reference signal Vref is ΔV1, and the laser diode 301 outputs a light ray according to the stronger write power such that a pit is formed on the CD-R disk. In time slot T2, the potential difference between the feedback control signal FPDO and the reference signal Vref is ΔV2, which is smaller than ΔV1, the laser diode 301 outputs a light ray according to the weaker read power such that a land is formed on the CD-R disk.

When the read sampling signal Rfpdo_SH is high, the sample/hold unit S/H samples the feedback control signal FPDO to obtain the signal FPDO_SH. Usually, the read sampling signal Rfpdo_SH turns into high when the feedback control signal FPDO approaches the stable state in time slot T2.

FIG. 4 shows signal waveforms of the feedback control signal FPDO' and the read sampling signal Rfpdo_SH' when the high-speed write operation is being performed. As shown in FIG. 4, when the high-speed write operation is performed, the obtained feedback control signal FPDO' becomes very unstable because the disk is rotated very fast and the laser diode has to output a stronger write power to write in time slot T1'. The unstable feedback control signal FPDO' disables the sample/hold unit S/H from correctly sampling the feedback control signal FPDO' in time slot T2', and the feedback control signal obtained by the sample/hold unit (S/H) is usually too high. In this condition, the timing of the read sampling signal Rfpdo_SH' usually has to be finely tuned, and the value of the voltage DAC1 is changed by way of try and error in order to improve the system's stability. However, such a way is very complicated and time-consuming. Thus, it is necessary to design an associated circuit to solve the above-mentioned problems.

SUMMARY OF THE INVENTION

It is therefore an object of the invention to provide a method for controlling read power and an open-loop read control device using the same, wherein the unstable problem of the feedback control signal may be solved according to the advantage that the open-loop read control device can control the laser diode to output constant read power in the write process.

The invention achieves the above-identified object by providing a method for controlling read power being used in a CD writer. The optical disk writer includes an open-loop read control device and a pickup head device. The pickup head device has a laser diode. The open-loop read control device includes a memory, a DAC and an amplifier. The DAC is coupled to the amplifier and the memory. The memory stores a relationship curve. The relationship curve records a relationship between an output value of the memory and an output voltage of the amplifier. The method of the invention is for enabling the open-loop read control device to control the laser diode to generate constant read power when a disk is being written. First, a relationship curve is obtained through a calibration procedure. Next, a voltage corresponding to the read power when the optical disk writer controls the laser diode to read the disk is defined as a specific voltage. Then, a corresponding reference value corresponding to the specific voltage is obtained according to the relationship curve. Next, the memory is caused to fixedly output the corresponding reference value. When the disk is being written, the memory fixedly outputs the corresponding reference value such that the amplifier outputs a read power control voltage corresponding to the corresponding reference value. The read power control voltage is for enabling the laser diode to generate the substantially constant read power.

The invention also achieves the above-identified object by providing an open-loop read control device being used in a CD writer. The optical disk writer includes a pickup head device having a laser diode. When the write process is not performed, the read power of the optical disk writer for reading the disk corresponds to a specific voltage. The open-loop read control device includes a memory, a DAC and an amplifier. The memory is for storing a relationship curve and outputting a corresponding reference value corresponding to the specific voltage. The DAC converts the corresponding reference value into an analog corresponding reference value. The amplifier receives the analog corresponding reference value and outputs a read power control voltage. The read power control voltage controls the laser diode in the write process.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 5:
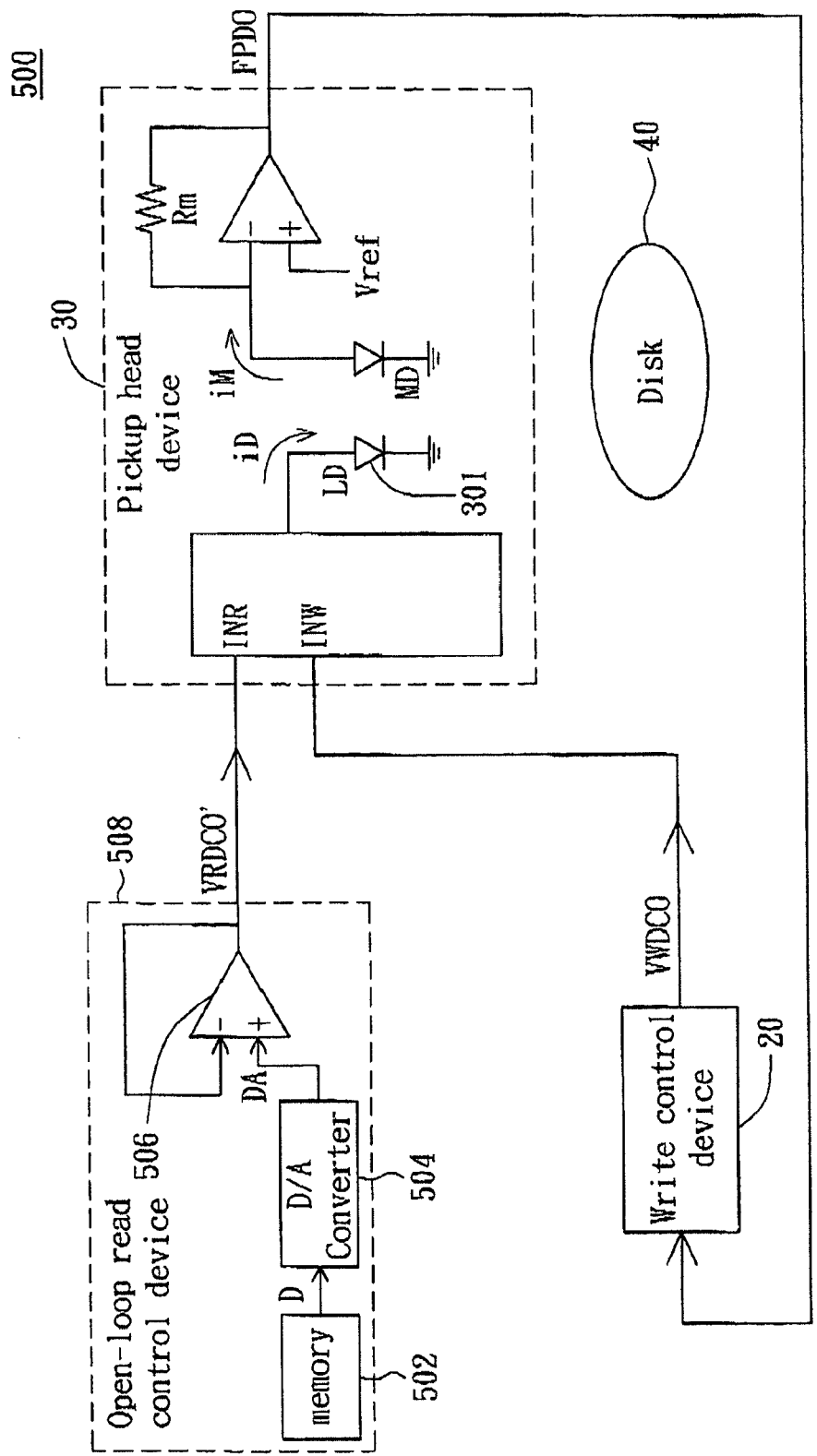
FIG. 5 is a block diagram showing an optical disk writer using the method and device of the invention.

FIG. 5 is a block diagram showing an optical disk writer using the method and device of the embodiment of the invention. The optical disk writer 500 includes a pickup head device 30 and an open-loop read control device 508. The pickup head device 30 includes a laser diode 301. The laser diode 301 generates a laser beam to read/write a disk 40. The open-loop read control device 508 is for outputting a read power control voltage VRDCO'. The open-loop read control device 508 includes a memory 502, a DAC (Digital to Analog Converter) 504 and an amplifier 508. The memory 502 is for storing a relationship curve and outputting a reference value D. The DAC 504 is for converting the reference value D into an analog reference value AD. The amplifier 508 receives the analog reference value AD and outputs the read power control voltage VRDCO'. The read power control voltage VRDCO' is for controlling the laser diode 301 in the write process. The relationship curve is obtained through a calibration procedure. The relationship curve records a relationship between the read power control voltage VRDCO' and the reference value D.

Figure 6:
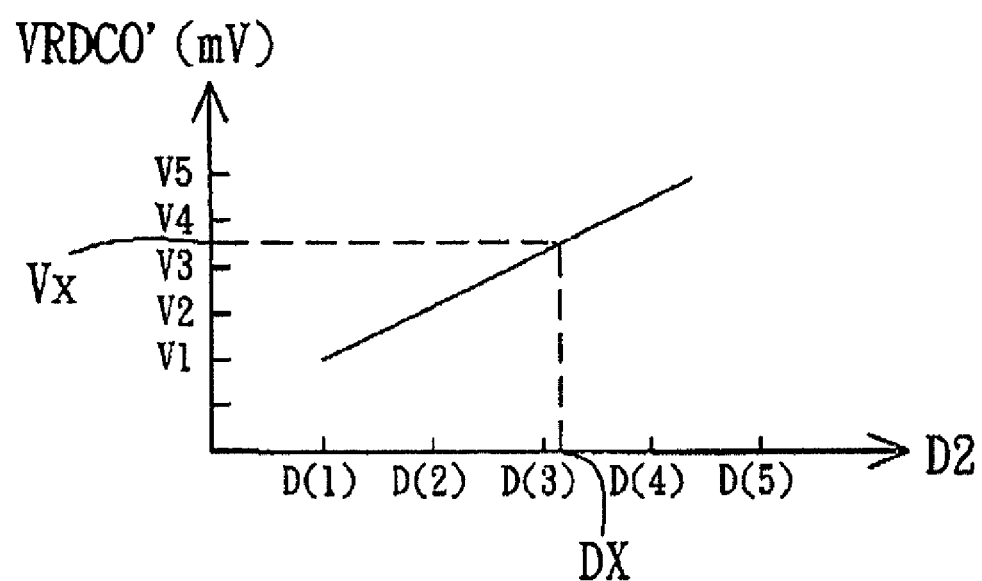
FIG. 6 shows a relationship curve between a target reference value and a second read power control voltage obtained after a calibration procedure.

FIG. 6 shows a relationship curve between the read power control voltage VRDCO' and the reference value D, which is obtained through the calibration procedure. As shown in FIG. 6, the memory 502 outputs five reference values D including D(1) to D(5), and it is measured that the open-loop read control device 508 outputs the voltages V1 to V5 of the read power control voltages VRDCO'. Thus, the relationship curve may be obtained according to the reference values D(1) to D(5) and the voltages V1 to V5. The calibration procedure may be performed before the write process or before the writer is shipped out.

In order to cause the pickup head device 30 to generate the substantially constant read power to write the optical disk 40, the invention defines the voltage corresponding to the read power when the optical disk writer 500 controls the laser diode 301 to read the disk 40 as a specific voltage after the relationship curve is obtained through the calibration procedure. Next, a corresponding reference value DX corresponding to the specific voltage is obtained according to relationship curve. Then, the memory 502 is caused to fixedly output the corresponding reference value DX. When the write process is performed, the memory 502 fixedly outputs the corresponding reference value DX to cause the amplifier 508 to output a read power control voltage VRDCO' corresponding to the corresponding reference value DX. The read power control voltage VRDCO' is for causing the laser diode 301 to generate the substantially constant read power.

Furthermore, before the write process, the control voltage corresponding to the read power of the optical disk writer 500 for reading the disk 40 is a specific voltage. The corresponding reference values DX may be found among the reference values D according to the relationship curve of FIG. 6. The read power of the optical disk writer 500 described above before the write process is the average read power for reading the disk 40 while the optical disk writer 500 performing the tracking operation, for example. When the write process is performed, it is only necessary to make the memory 502 output the corresponding reference value DX such that the voltage of the read power control voltage VRDCO' substantially equals the specific voltage. So, when the write process is performed, the memory 502 is caused to fixedly output the corresponding target reference value DX such that the read power control voltage VRDCO' makes the laser diode 301 generate the substantially constant target read power.

Consequently, the invention may solve the problem, in which the sample/hold unit S/H cannot correctly sample the feedback control signal FPDO' in time slot T2' owing to the unstable feedback control signal FPDO' in the conventional CD writer. The feedback control signal FPDO' obtained by the sample/hold unit (S/H) is usually too high. In this case, the timing of the read sampling signal Rfpdo_SH' usually has to be finely tuned, and the value of the voltage DAC1 is usually changed by way of try and error in order to improve the system's stability. However, such a way is very complicated and time-consuming. According to the open-loop read control device 508 of the invention, the advantage of outputting the substantially constant read power in the write process may be obtained to solve the drawback in the conventional CD writer, which outputs the unstable read power during the write process owing to the unstable feedback control signal FPDO'.

Figure 1:
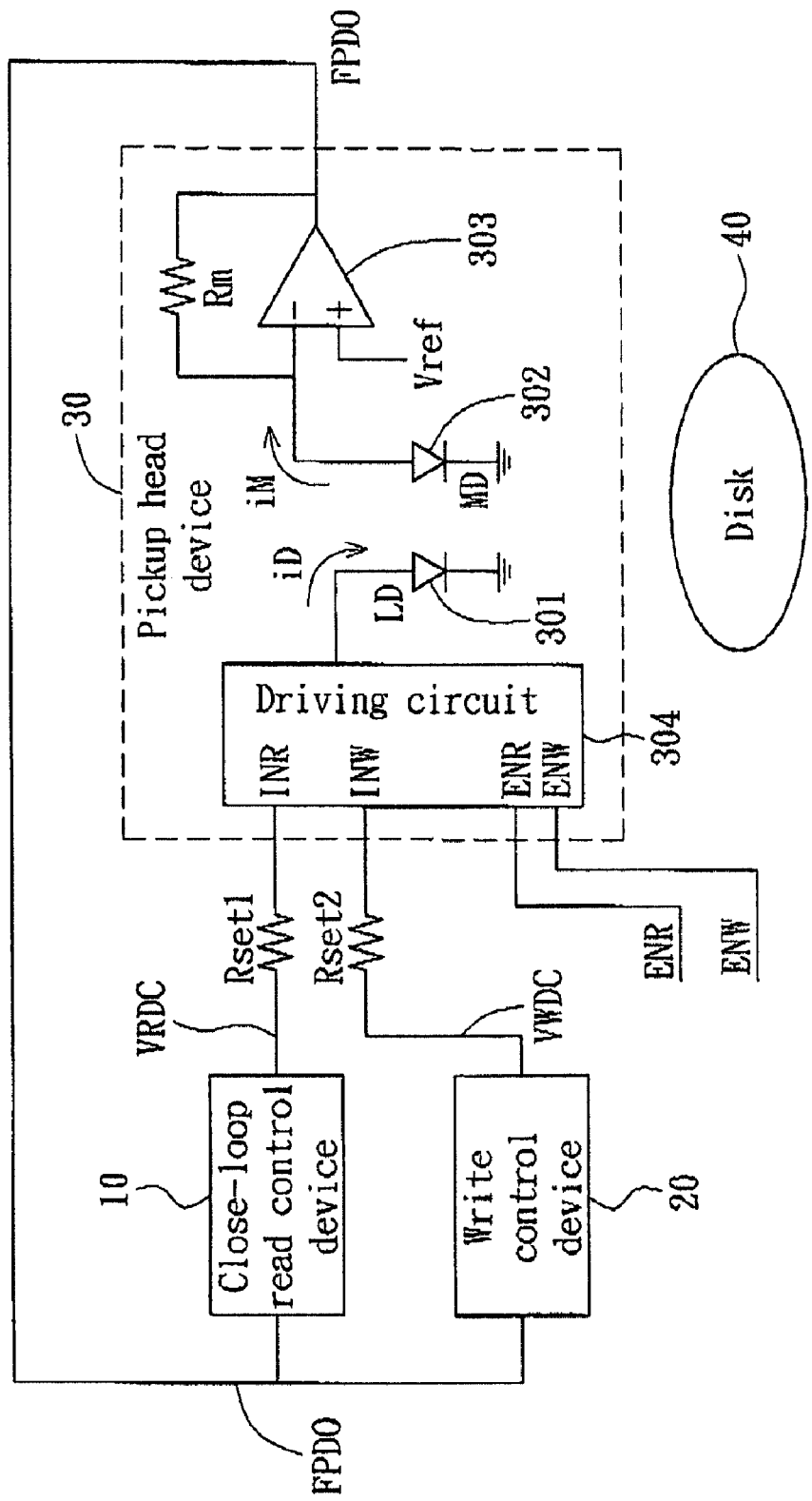
FIG. 1 is a block diagram showing a conventional CD writer.
Figure 2:
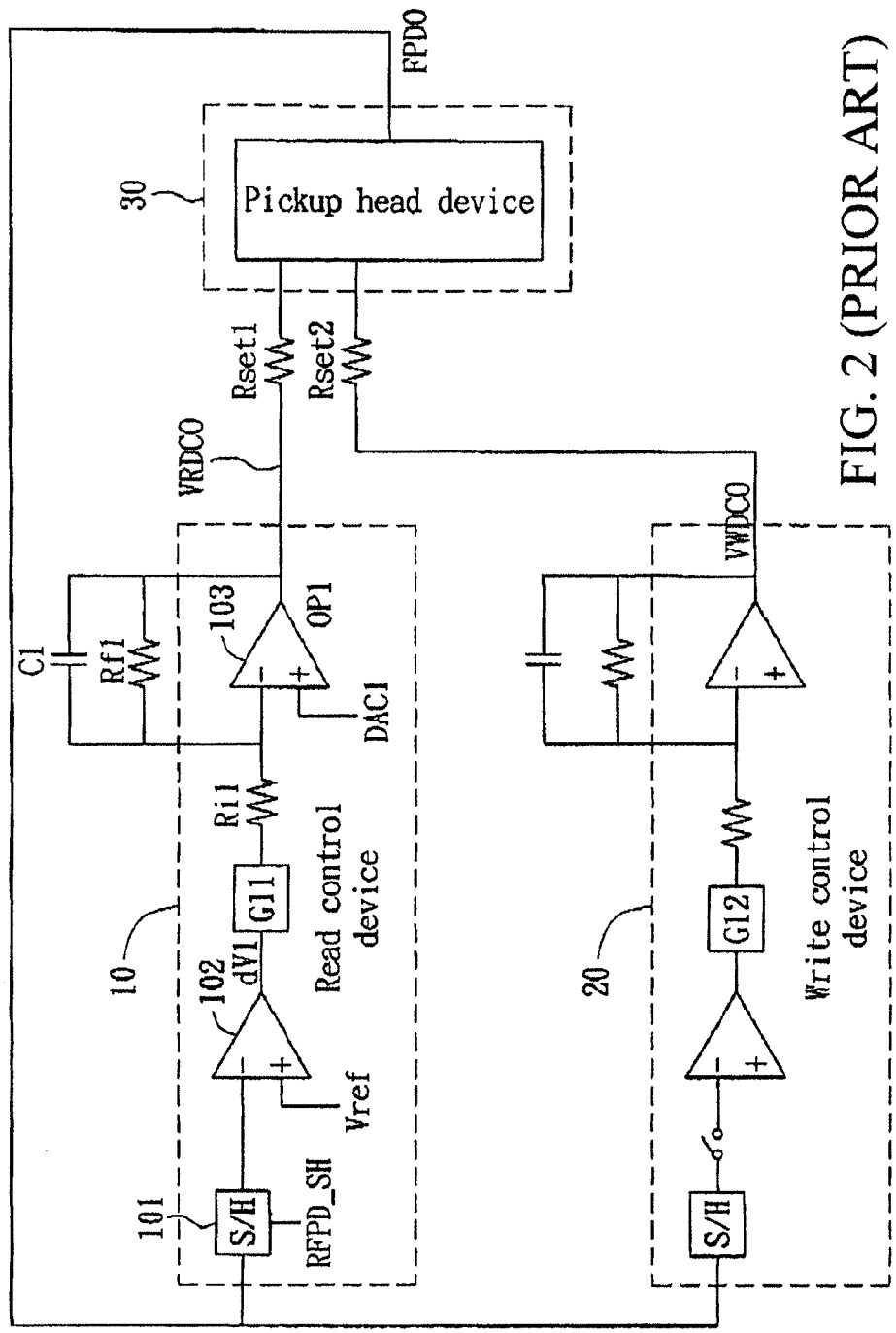
FIG. 2 is a detailed circuit block diagram showing a read control device and a write control device.
Figure 3:
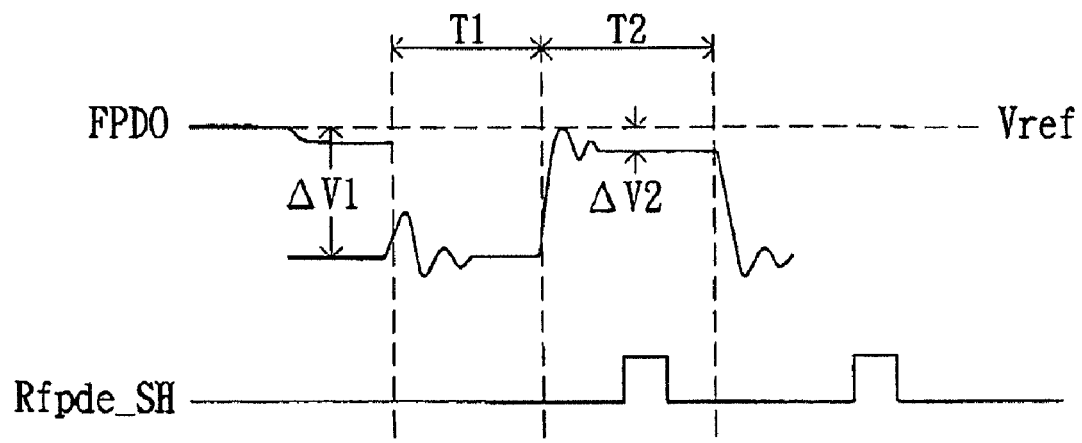
FIG. 3 shows signal waveforms of the feedback control signal FPDO and a read sampling signal Rfpdo_SH when a low-speed write operation is being performed.
Figure 4:
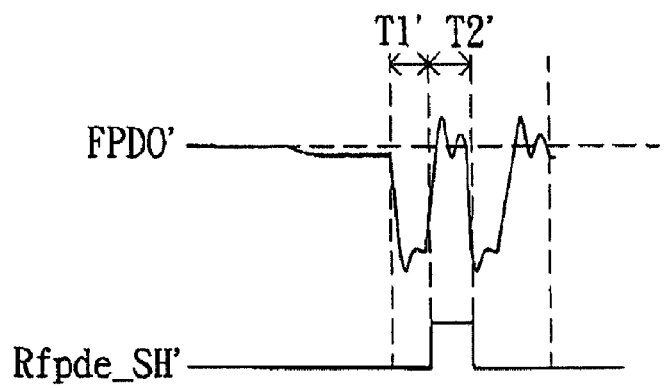
FIG. 4 shows signal waveforms of the feedback control signal FPDO' and the read sampling signal Rfpdo_SH' when the high-speed write operation is being performed.

The method according to the embodiment of the invention and the conventional close-loop read control device 10 of FIG. 2 also may be alternatively used. When the optical disk writer 500 only reads the disk, the conventional close-loop read control device 10 of FIG. 2 may be used. When the write operation is to be performed, the open-loop read control device 508 of the invention of FIG. 5 is used. The optical disk writer 500 of the invention can be a CD-R writer, a DVD-R writer, a CD-RW writer, or a DVD-RW writer.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical disk writer, comprising:
   a pickup head device configured to receive a read power control voltage and a write control voltage;
   an open-loop read control device configured to output the read power control voltage, wherein the open-loop read control device comprises:

a memory configured to store a relationship curve specifying multiple output read power control voltages corresponding to multiple reference values and to output a selected reference value of the multiple reference values, wherein the selected reference value is output as a substantially constant value during the write process; and a write control device configured to output the write control voltage;

wherein the read power control voltage is substantially constant during the write process.

2. The optical disk writer according to claim 1, wherein the pickup head device comprises a laser diode for generating a light beam to write information onto a disk.

3. The optical disk writer according to claim 1, wherein the open-loop read control device further comprises:

a Digital to Analog Converter (DAC) configured to convert the reference value into an analog reference value; and an amplifier configured to receive the analog reference value and to output a corresponding read power control voltage based on the stored relationship curve.

4. The optical disk writer according to claim 1, wherein a read power of the optical disk writer for reading the disk corresponds to a specific voltage before the write process, the open-loop read control device obtains a corresponding reference value corresponding to the specific voltage according to the relationship curve, and the memory uses the corresponding reference value to output the reference value.

5. An open-loop read control device for use in an optical disk writer, wherein the optical disk writer comprises a pickup head device and a write control device, the open-loop read control device comprising:

a memory configured to store a relationship curve specifying multiple output read power control voltages corresponding to multiple reference values and to output a selected reference value of the multiple reference values, wherein the selected reference value is output as a substantially constant value during the write process; and an amplifier configured to receive the selected reference value and output a corresponding read power control voltage based on the stored relationship curve, wherein the corresponding read power control voltage and a write control device output voltage from the write control device control the pickup head device during a write process, and wherein the corresponding read power control voltage is substantially constant.

6. The open-loop read control device according to claim 5, further comprising:

a Digital to Analog Converter (DAC) for converting the selected reference value into an analog corresponding reference value.

7. A method for controlling a read power used in an optical disk writer, the method comprising:

defining a voltage corresponding to the read power when the optical disk writer reads an optical disk at a specified voltage and obtaining a corresponding reference value corresponding to the specified voltage according to a relationship curve, wherein the relationship curve specifies multiple output read power control voltages corresponding to multiple reference values in a relationship between an output value of a memory and an output voltage of an amplifier, the memory and amplifier configured to operate with the optical disk writer;

retrieving from the memory a reference value corresponding to the defined voltage based on the stored relationship curve; and outputting the corresponding reference value and thereby causing the amplifier to output a read power control voltage that is substantially constant during the writing operation.

8. The method of claim 7, further comprising obtaining the relationship curve through a calibration procedure.

9. The method according to claim 8, wherein the calibration procedure comprises:

enabling the memory to output multiple reference values, and measuring multiple voltage values outputted from the amplifier, wherein a relationship between the reference values and the voltage values is the relationship curve, and wherein the read power control voltage is one of the voltage values.

10. The method according to claim 8, wherein the calibration procedure is performed before writing.

11. An optical disk writer, comprising:

pickup means for receiving a read power control voltage and a write control voltage;

read control means for outputting the read power control voltage, wherein the read control means comprises:

memory means for storing a relationship curve specifying multiple output read power control voltages corresponding to multiple reference values and for outputting a selected reference value of the multiple reference values, wherein the selected reference value is output as a substantially constant value during a write process; and write control means for outputting the write control voltage;

wherein the read power control voltage is substantially constant during the write process.

12. The optical disk writer according to claim 11, wherein the read control means further comprises:

converting means for converting the reference value into an analog reference value; and amplifying means for receiving the analog reference value and for outputting a corresponding read power control voltage based on the stored relationship curve.

13. The optical disk writer according to claim 11, wherein a read power of the optical disk writer for reading the disk corresponds to a specific voltage before the write process, the read control means obtains a corresponding reference value corresponding to the specific voltage according to the relationship curve, and the memory uses the corresponding reference value to output the reference value.

* * * * *